C. A. J. LENGELÉE.
Apparatus for Shearing Animals.
No. 137,220.          Patented March 25, 1873.
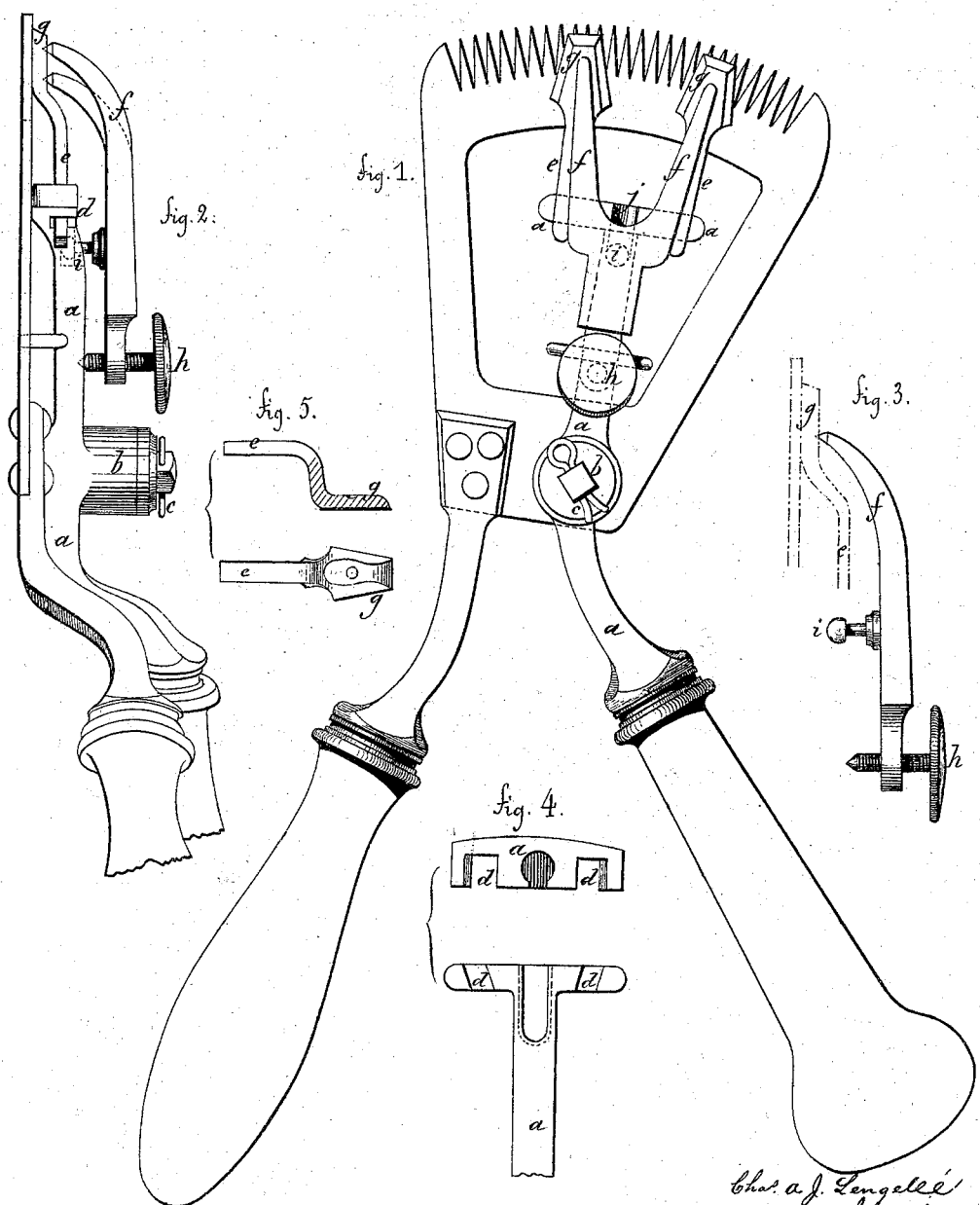

UNITED STATES PATENT OFFICE.

CHARLES AUGUSTE JOSEPH LENGELÉE, OF PARIS, FRANCE.

IMPROVEMENT IN APPARATUS FOR SHEARING ANIMALS.

Specification forming part of Letters Patent No. 137,220, dated March 25, 1873.

*To all whom it may concern:*

Be it known that I, CHARLES AUGUSTE JOSEPH LENGELÉE, of the firm Bétis, Espinasse & Co., of Paris, manufacturers, have invented an Improvement in Clips or Shears for Clipping or Shearing Horses and other Animals, of which the following is a specification:

This improvement relates to the action of the free blades, and to the arrangement for keeping the latter firmly against the toothed sector whatever the nature of the skin, hair, or other substance to be clipped may be. The blade-carrier pivots upon an axle, and carries at its end screws or pins, upon which pressure-levers are mounted. These levers carry an oscillating cross-piece, and this cross-piece carries a pressure-screw, the end of which bears upon the blade-carrier. The levers press by their other end, which is curved, against the blades, the rear part of which is freely engaged into grooves or recesses in the blade-carrier. The degree of pressure upon the levers against the blades is regulated by the screw upon the cross-piece, which can be turned by the hand, so that the blades cannot yield whatever may be the nature of the substances they have to clip.

The drawing hereunto annexed shows clearly the clips or shears with the improvement to which claim is made.

Figure 1 is a plan view of the improved instrument, and Fig. 2 a side view. Fig. 3 shows separately the pressing mechanism by which the blades are held close to the toothed sector or comb. Fig. 4 shows the front end of the lever of the blade-carrier, while Fig. 5 shows one of the two blades separately.

The blade-carrier $a$ pivots upon an axle, $b$, and is held in place by a pin or key, $c$, passed transversely through the head. The fore end of the carrier has two arms with grooves $d\ d$ for receiving the stems $e\ e$ of the blades.

The pressing mechanism is composed of two independent levers attached to a cross-piece common to both of them, and through which a pressure-screw passes to bear upon the blade-carriers, or a single piece may be used in the form of a fork, the two arms $f\ f$ of which bear upon and engage into the blades $g\ g$, while the head of the fork has a regulating-screw, $h$, Figs. 1, 2, and 3. This fork centers upon a pivot, $i$, Fig. 3, of a ball-and-socket form, to give the presser freedom of action when the blades are cutting.

This arrangement for the pressing mechanism is very advantageous, since it permits the fork to move slightly both crosswise and lengthwise, so that the cutting can be accomplished in a very effective manner; and

Having now described the nature of the said invention, and in what manner the same is to be performed, I declare that I claim—

In combination with the toothed sector, provided with its fixed handle, the pivoted handle, upon which is arranged the blade carrier or carriers $a$, having seats for the rear end of the blades, the adjusting lever or levers $f$, and the set-screw $h$, whereby the pressure of the movable blades may be adjusted, substantially as set forth.

In testimony whereof I have signed my name to this specification before two subscribing witnesses.

C. A. J. LENGELÉE.

Witnesses:
   H. BÉTIS,
   ALBERT CAHEN.